(12) United States Patent
Dearman et al.

(10) Patent No.: US 9,684,388 B2
(45) Date of Patent: *Jun. 20, 2017

(54) METHOD AND APPARATUS FOR DETERMINING AN OPERATION BASED ON AN INDICATION ASSOCIATED WITH A TANGIBLE OBJECT

(75) Inventors: David Dearman, San Bruno, CA (US);
Hiroshi Horii, Pacifica, CA (US);
Vivek Shrivastava, San Francisco, CA (US)

(73) Assignee: Nokia Technologies Oy, Espoo (FI)

( * ) Notice: Subject to any disclaimer, the term of this patent is extended or adjusted under 35 U.S.C. 154(b) by 129 days.

This patent is subject to a terminal disclaimer.

(21) Appl. No.: 13/409,532

(22) Filed: Mar. 1, 2012

(65) Prior Publication Data

US 2013/0229331 A1 Sep. 5, 2013

(51) Int. Cl.
*G06F 3/033* (2013.01)
*G06F 3/0354* (2013.01)
(Continued)

(52) U.S. Cl.
CPC .......... *G06F 3/03545* (2013.01); *G06F 3/017* (2013.01); *G06F 3/04883* (2013.01); *G06F 2203/04807* (2013.01)

(58) Field of Classification Search
CPC .... G06F 3/03545; G06F 3/033; G06F 3/0416; G06F 3/041; G06F 3/0488
(Continued)

(56) References Cited

U.S. PATENT DOCUMENTS 6,137,479 A 10/2000 Olsen et al.
7,966,352 B2 6/2011 Madan et al.
(Continued)

FOREIGN PATENT DOCUMENTS

EP 1 514 219 A1 3/2005
WO WO-03/105064 A1 12/2003

OTHER PUBLICATIONS

Buykx, L., et al.; "Capture family recipes for digial sharing across the generations"; [Online]; [Retrieved on Dec. 9, 2011]; Retrieved from the Internet <URL: http://www-users.cs.york.ac.uk/~pcairns/papers/Buykx_Include2011.pdf.
(Continued)

*Primary Examiner* — Amy Ng
*Assistant Examiner* — Sang H Kim
(74) *Attorney, Agent, or Firm* — Alston & Bird LLP

(57) ABSTRACT

An apparatus, method, and computer program product are described that can receive a signal from a tangible object, where the signal includes an indication of an operation to be executed upon receipt of a user input applied by the tangible object, and that can determine the operation based on the indication. In this way, the user is not required to provide additional user input to define the particular operation that is desired. The apparatus may determine at least one recipient with whom data selected via a user input applied by the tangible object may be shared. The apparatus may further provide for the determination of an operation to be executed based on an identification of a selection of content and may provide for the association of the operation with the tangible object, such that subsequent user input applied via the tangible object causes execution of the operation.

19 Claims, 13 Drawing Sheets

(51) Int. Cl.
  *G06F 3/01* (2006.01)
  *G06F 3/0488* (2013.01)
(58) Field of Classification Search
  USPC .................................. 715/835; 345/173, 179
  See application file for complete search history.

(56) References Cited

U.S. PATENT DOCUMENTS

| | | | |
|---|---|---|---|
| 7,975,216 | B2 | 7/2011 | Woolf et al. |
| 8,019,184 | B2 | 9/2011 | Silverbrook et al. |
| 2004/0189591 | A1* | 9/2004 | Breuil ........................... 345/156 |
| 2006/0066591 | A1* | 3/2006 | Marggraff et al. ........... 345/179 |
| 2006/0206564 | A1 | 9/2006 | Burns et al. |
| 2007/0143663 | A1 | 6/2007 | Hansen et al. |
| 2007/0167136 | A1 | 7/2007 | Groth |
| 2007/0283248 | A1* | 12/2007 | Yoshida ........................ 715/526 |
| 2008/0076418 | A1 | 3/2008 | Beyer, Jr. |
| 2008/0273797 | A1 | 11/2008 | Takikawa et al. |
| 2009/0000831 | A1 | 1/2009 | Miller et al. |
| 2009/0024988 | A1* | 1/2009 | Edgecomb et al. .......... 717/168 |
| 2009/0084610 | A1 | 4/2009 | Silverbrook et al. |
| 2010/0031201 | A1 | 2/2010 | de Haan |
| 2010/0232730 | A1* | 9/2010 | Silverbrook et al. ......... 382/314 |
| 2011/0084904 | A1 | 4/2011 | Tan |
| 2012/0146918 | A1* | 6/2012 | Kreiner ............... H04M 1/7253 345/173 |
| 2013/0088427 | A1* | 4/2013 | Liu ......................... G06F 3/017 345/157 |
| 2013/0154933 | A1* | 6/2013 | Sheik-Nainar ................ 345/163 |

OTHER PUBLICATIONS

"Digital writing; travelers instant blog"; [Online]; [Retrieved on Dec. 9, 2011]; Retrieved from the Internet <URL: http://www.kh-berlin.de/user_uploads/1112/100807_13_08_03_see.pdf.

Dixon, D.; "*Eye-Fi—Wi-Fi SD Card for Digital Cameras*;" Manifest Technology: Digital Imaging Articles; dated Dec. 2007; retrieved on Dec. 1, 2007 from <http://www.manifest-tech.com/ce_photo/eye-fi-wi-fi.htm>.

Haller, M., et al.; "*Shared Design Space: Sketching Ideas Using Digital Pens and a Large Augmented Tabletop Setup*;" Advances in Artificial Reality and Tele-Existence Lecture Notes in Computer Science; pp. 185-196; dated Jan. 1, 2006.

Steimle, J., et al.; "*CoScribe: Integrating Paper and Digital Documents for Collaborative Knowledge Work*;" IEEE Transactions on Learning Technologies, vol. 2, No. 3; pp. 174-188; dated Jul. 1, 2009.

Steimle, J., et al.; "*CoScribe: Using Paper for Collaborative Annotations in Lectures*;" Eigth IEEE International Conference on Advanced Learning Technologies; pp. 306-310; dated Jul. 1, 2008.

"*Customer Reviews: Eye-Fi Share 2 GB Wi-Fi SD Flash Memory Card EYE-FI-2GB (Old Version)*;" retrieved on Oct. 28, 2010 from <http://www.amazon.com/Eye-Fi-Share-Memory-EYE-FI-2GB-VERSION/Product-reviews/B00027XDC?pageNumber=10>.

International Search Report and Written Opinion for Application No. PCT/FI2013/050176; dated May 28, 2013.

International Search Report and Written Opinion for Application No. PCT/FI2013/050178; dated May 28, 2013.

International Search Report and Written Opinion for Application No. PCT/FI2013/050190; dated May 28, 2013.

"*Title: e-Desk—A Pen Based Information Digitizing and Collaboration Platform*;" ip.com Inc, ip.com Journal; dated Jun. 12, 2003.

Office Action for U.S. Appl. No. 13/409,739 dated Aug. 15, 2013.
Office Action for U.S. Appl. No. 13/409,739 dated Jul. 3, 2014.
Office Action for U.S. Appl. No. 13/409,836 dated Jul. 14, 2014.
Office Action for U.S. Appl. No. 13/409,739 dated Dec. 29, 2014.
Office Action for U.S. Appl. No. 13/409,836 dated Jan. 14, 2015.
Office Action for U.S. Appl. No. 13/409,739 dated Aug. 13, 2015.
Office Action for U.S. Appl. No. 13/409,836 dated Aug. 24, 2015.
Office Action for U.S. Appl. No. 13/409,739 dated Feb. 5, 2016.
Office Action for U.S. Appl. No. 13/409,836 dated Feb. 12, 2016.
Office Action for U.S. Appl. No. 13/409,836 dated Feb. 10, 2014.
Office Action for U.S. Appl. No. 13/409,739 dated Jan. 16, 2014.
Advisory Action for U.S. Appl. No. 13/409,739 dated Jun. 13, 2016.
Notice of Panel Decision from pre-Appeal Brief Review for U.S. Appl. No. 13/409,739 dated Oct. 5, 2016.
Office Action for U.S. Appl. No. 13/409,739 dated Jan. 17, 2017.
Office Action for U.S. Appl. No. 13/409,836; dated Aug. 27, 2013.

* cited by examiner

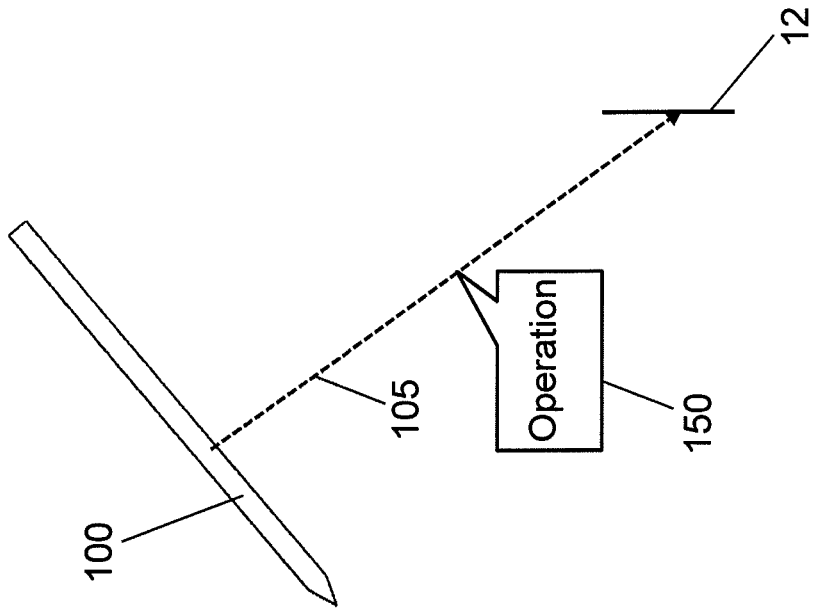
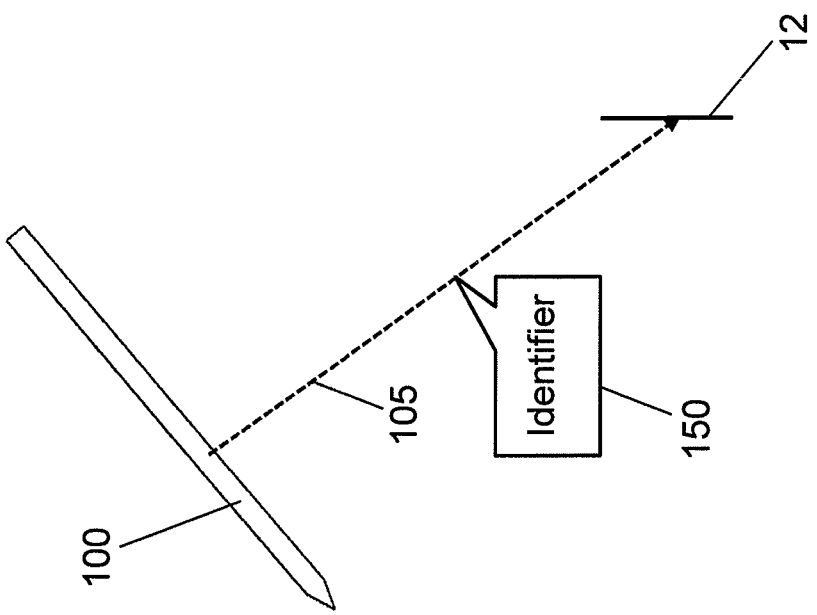

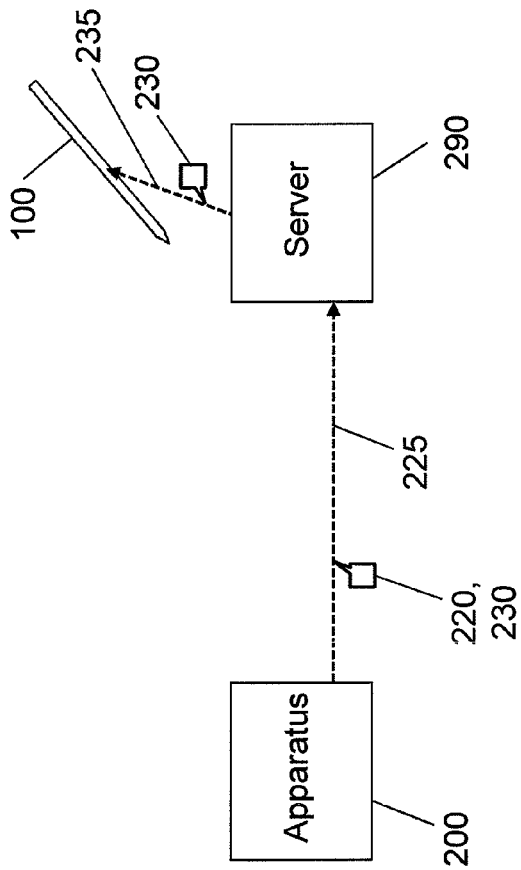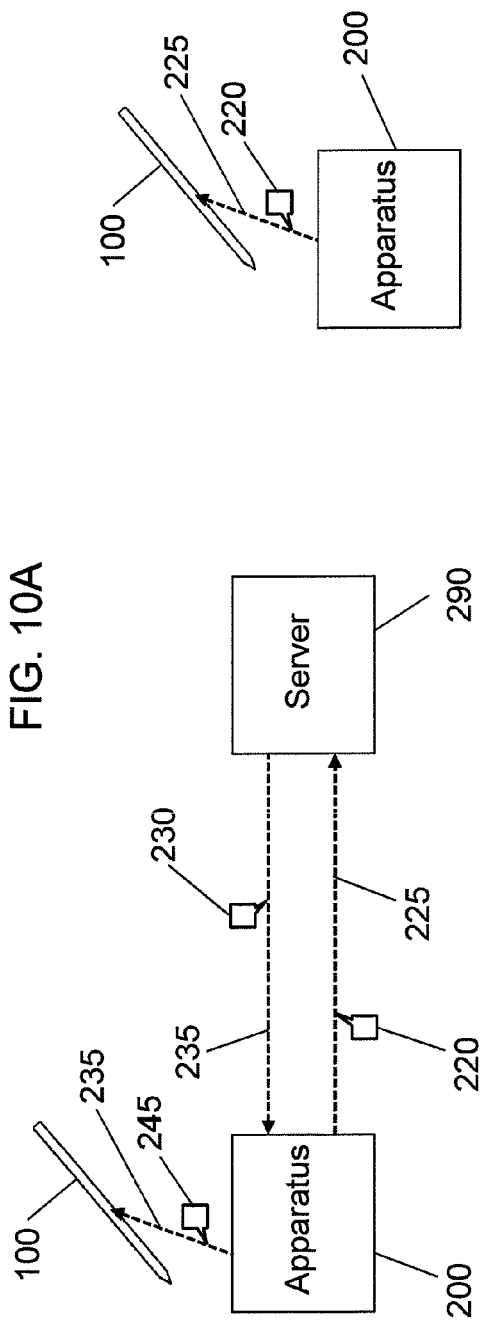

METHOD AND APPARATUS FOR DETERMINING AN OPERATION BASED ON AN INDICATION ASSOCIATED WITH A TANGIBLE OBJECT

TECHNOLOGICAL FIELD

Embodiments of the present invention relate generally to determining an operation to be executed by an apparatus based on an indication received from a tangible object.

BACKGROUND

As digital information becomes more prevalent in society, the need to access and share such information is constantly growing. Devices for capturing, creating, manipulating, and/or storing such information abound, from digital cameras to cellular phones to laptop computers and other personal mobile devices. As a result, an increasing number of people are becoming users of such devices.

In addition to being able to access information from such devices, users also desire to share information between devices and/or execute operations accurately and efficiently with minimal user input. For example, a user may want to share a file with multiple recipients.

The use of tangible objects to provide inputs to a user device has also seen increasing popularity. A user may, for example, provide touch inputs to a touch screen display via a tangible object, such as a stylus, to execute certain operation. In some cases, however, the user may not have access to his or her own device, but may have access to his or her tangible object.

Accordingly, it may be desirable to provide an improved mechanism for executing operations across different user devices using a tangible object.

BRIEF SUMMARY OF EXAMPLE EMBODIMENTS

Accordingly, embodiments of an apparatus, method, and computer program product are described that can determine an operation to be executed based on an indication received from a tangible object. In particular, embodiments of an apparatus for determining an operation to be executed may include at least one processor and at least one memory including computer program code. The at least one memory and the computer program code may be configured to, with the processor, cause the apparatus to receive a signal from a tangible object proximate the apparatus, where the signal includes an indication of an operation to be executed upon receipt of a user input applied by the tangible object. The at least one memory and the computer program code may be further configured to, with the processor, cause the apparatus to determine the operation based on the indication, receive a user input via interaction with the tangible object, and execute the operation based on the user input that is received. The operation may be executed automatically upon receipt of the user input.

In some cases, the indication may comprise an identifier of the tangible object or a user associated with the tangible object. Furthermore, the memory and computer program code may be configured to, with the processor, cause the apparatus to communicate with a server in response to receipt of the signal. The indication may, in some cases, designate the operation to be executed.

The user input may comprise selection of data. Moreover, the memory and computer program code may be configured to, with the processor, cause the apparatus to transmit the data selected to a server. In some cases, the memory and computer program code may be configured to, with the processor, cause the apparatus to transmit information derived from the data selected to a server.

In other embodiments, a method and a computer program product are described for determining an operation to be executed by receiving a signal from a tangible object, where the signal includes an indication of an operation to be executed upon receipt of a user input applied by the tangible object; determining the operation based on the indication; receiving a user input via interaction with the tangible object; and executing the operation based on the user input that is received. In some cases, the operation may be executed automatically upon receipt of the user input.

The indication may comprise an identifier of the tangible object or a user associated with the tangible object. In some cases, determining the operation based on the indication may comprise communicating with a server in response to receipt of the signal. The indication may designate the operation to be executed. Furthermore, the user input may comprise selection of data, and the method may further comprise transmitting the data selected to a server or transmitting information derived from the data selected to the server.

In still other embodiments, an apparatus is described for determining an operation to be executed. The apparatus may include means for receiving a signal from a tangible object, where the signal includes an indication of an operation to be executed upon receipt of a user input applied by the tangible object. The apparatus may further include means for determining, via a processor, the operation based on the indication, receiving a user input via interaction with the tangible object, and executing the operation based on the user input that is received.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5A illustrates the tangible object of FIGS. 3 and 4 transmitting a signal for which the indication is an identifier according to an example embodiment of the present invention;

FIG. 5B illustrates the tangible object of FIGS. 3 and 4 transmitting a signal for which the indication is a designation of an operation according to an example embodiment of the present invention;

FIGS. 10A-10C illustrate schematic block diagrams of different scenarios for providing for determination of an operation to be executed and providing for association of the operation with a tangible object with and without communication between the apparatus and the server according to example embodiments of the present invention;

Figure 13:
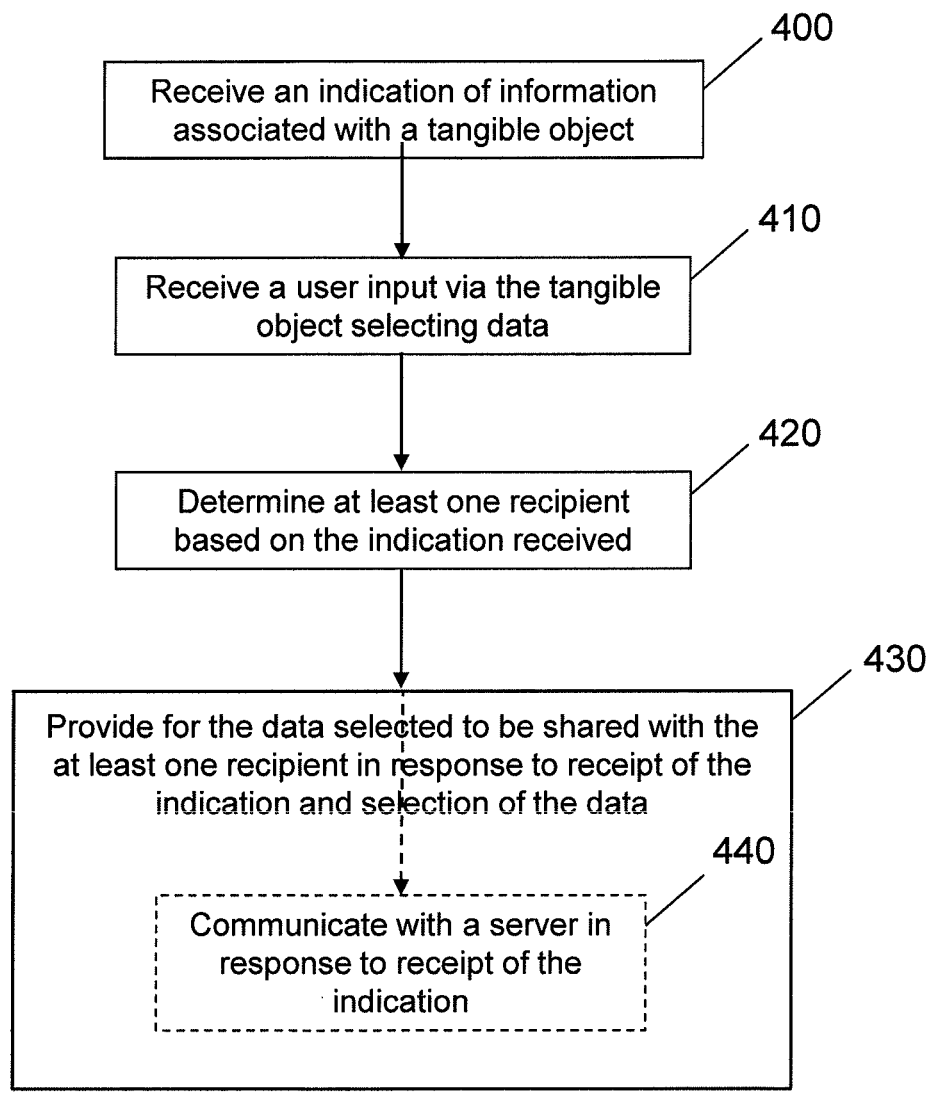
Figure 14:
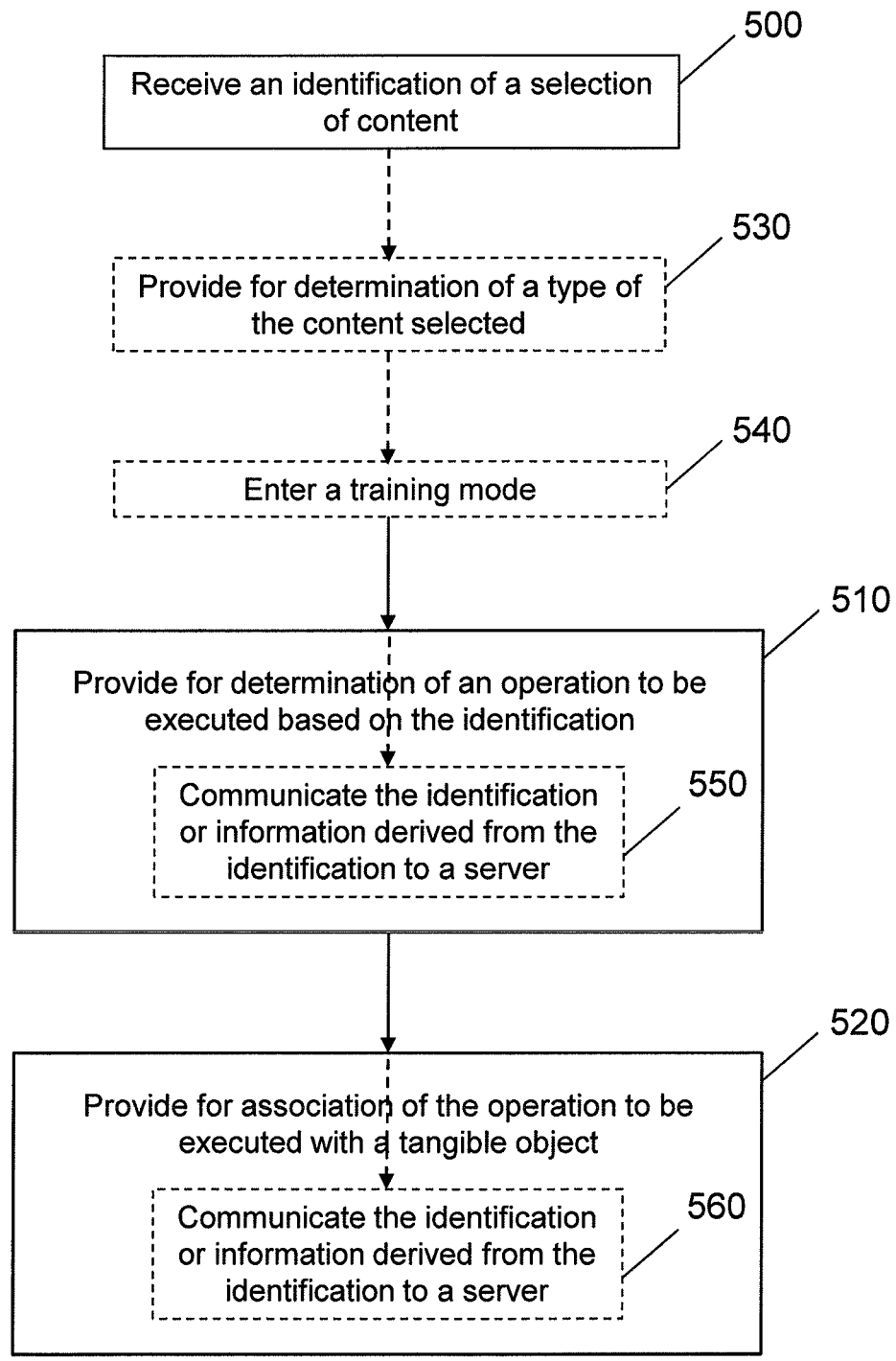

FIG. 13 illustrates a flowchart of methods of determining at least one recipient of data selected to be shared based on receipt of an indication of information associated with a tangible object in accordance with another example embodiment of the present invention; and FIG. 14 illustrates a flowchart of methods of providing for determination of an operation to be executed based on an identification of a selection of content received and providing for association of the operation to be executed with a tangible object in accordance with another example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

A tangible user interface is a form of user interface in which a user interacts with digital information using the physical environment. For example, a touch display, which may take the form of a table top, a tablet computer, or a portable digital assistant (PDA), for example, may be configured to allow a user to interact with data related to an object (e.g., a "tangible object") placed on or near the display surface. In other words, the display may be able to detect the presence of the tangible object, and the tangible object may in turn be used to provide user inputs to the apparatus embodying the touch display to execute certain operations, such as to present data via the display, to allow the user to view, modify, manipulate, or otherwise interact with the data, and/or to transmit the data (e.g., selected files) to designated recipients.

Tangible objects may take many forms, from a digital pen or a stylus to a glove worn by a user to another user device, such as a cellular telephone. For purposes of explanation, the description provided herein uses the example of a tangible object that is embodied by a stylus; however, it is understood that any object that is configured to be used by a user for interacting with a user device, such as via interaction with a touch screen of the user device, to provide inputs for executing certain operations may serve a tangible object.

In this regard, conventional tangible objects are typically passive devices that are used to provide inputs to a user device, such as a tablet computer, for executing operations. Such inputs may include the selection of certain data (e.g., through a touch input selecting a particular file represented on the touch display); the designation of a particular operation to execute (e.g., by applying two touch inputs in rapid succession to the represented file to open the corresponding document or selecting an option relating to the file; such as "Send" or "Copy"); the entry of text via touch gestures (e.g., strokes) that represent a written letter or word or via selection of certain "keys" presented on a soft keyboard provided on the touch display (e.g., to provide the e-mail address of a recipient to whom the selected file is to be sent); etc.

Thus, depending on the desired operation, a user may provide several inputs using the tangible object to fully describe and effect the execution of a single operation, such as an operation to send a particular file to a group of recipients. In some cases, for example, where a group of recipients is large or the same operation is desired to be executed with respect to multiple files, the application of multiple inputs for each desired operation can be burdensome to the user. Moreover, because the user is required to apply multiple inputs, the risk that one or more of the inputs may be incorrectly applied or mistakenly interpreted by the user device as a different input is augmented, leading to further inefficiencies and user frustration. In addition, by associating a desired operation and/or a list of recipients to receive a subsequent selection of a document with the tangible object, rather than with the apparatus, the tangible object may be used to effect the same operation across a number of capable devices, and not just the user's device.

Accordingly, embodiments of the apparatus, method, and computer program product described below provide for an apparatus that can receive a signal from a tangible object, where the signal includes an indication of an operation to be executed upon receipt of a user input applied by the tangible object, and that can determine the operation based on the indication. In this way, the user is not required to provide additional user input to define the particular operation that is desired. For example, in some embodiments, the apparatus, method, and computer program product described below can receive an indication of information associated with the tangible object and determine, based on the indication, at least one recipient with whom data selected via a user input applied by the tangible object may be shared. In other words, the recipient(s) of the data would not need to be designated by the user via separate user inputs, but would rather be pre-associated with the tangible object, as described below. In still other embodiments, the apparatus, method, and computer program product may receive an indication of a selection of content (e.g., via interaction of the tangible object with the touch display of the user device) and may in turn provide for the determination of an operation to be executed based on the indication and provide for the association of the operation with the tangible object, such that subsequent user input applied via the tangible object causes execution of the operation.

Figure 1:
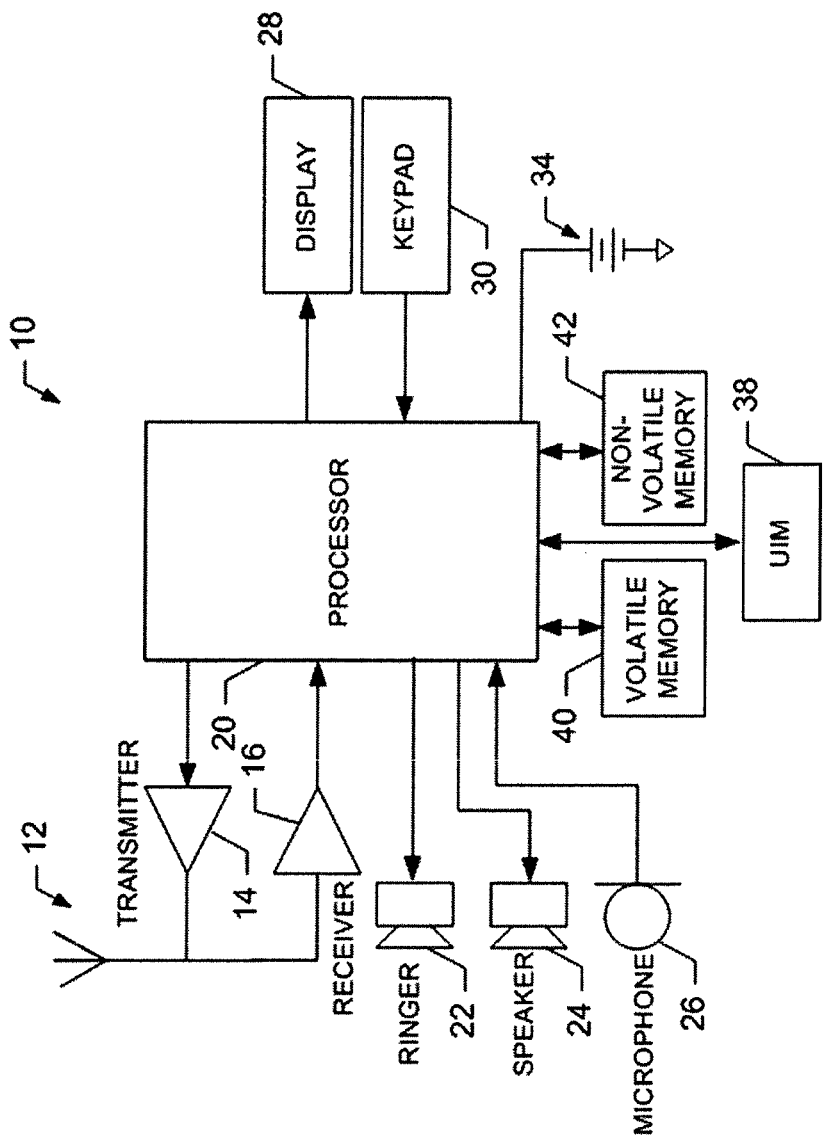
FIG. 1 illustrates one example of a communication system according to an example embodiment of the present invention.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include a proximity component and/or an orientation component, as described below. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for determining operations to be executed based on an indication received from a tangible object, determining recipients of data selected to be shared, and/or associating an operation to be executed with a tangible object are depicted. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile touch screen display, or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
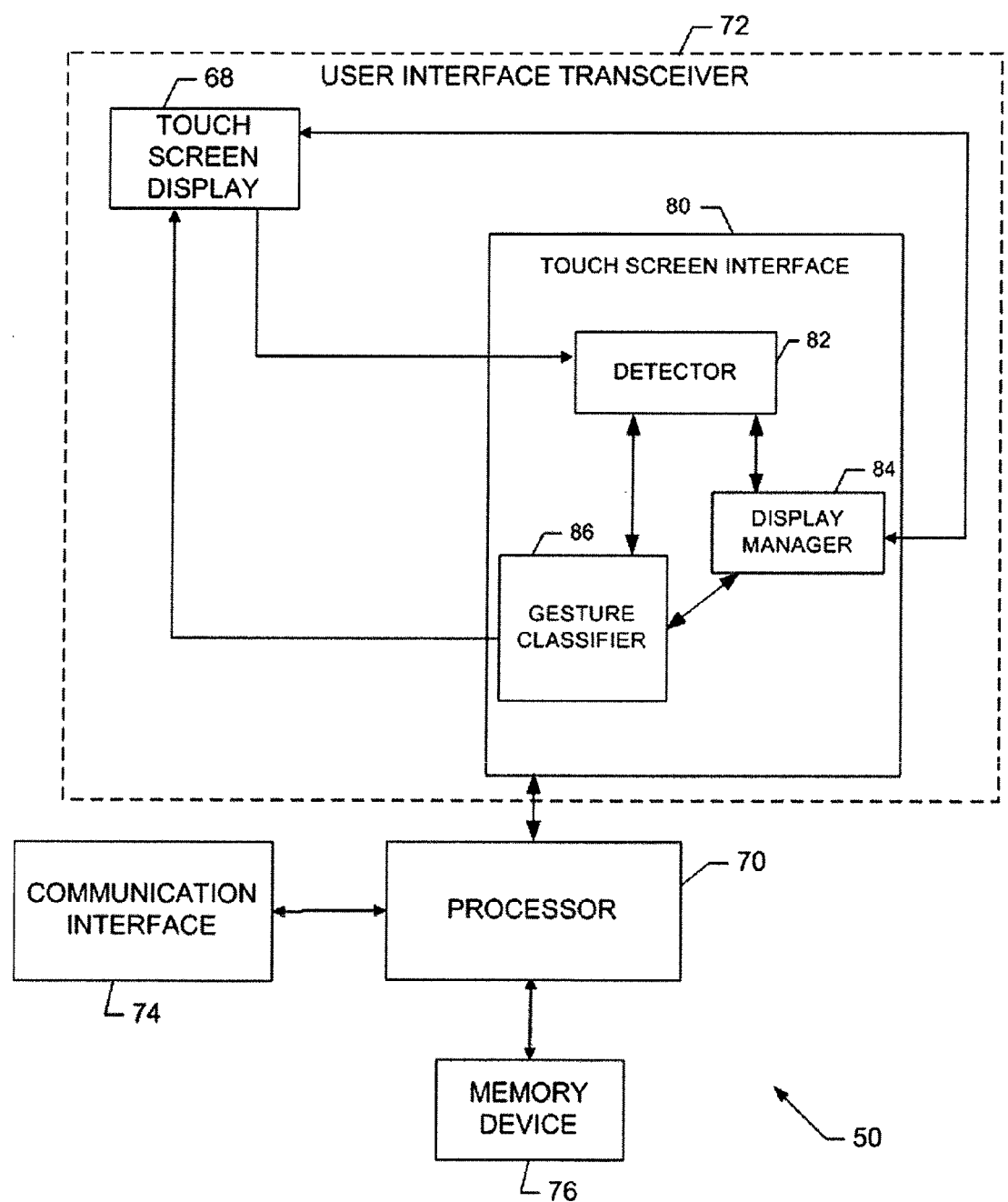
FIG. 2 illustrates a schematic block diagram of an apparatus for determining operations to be executed based on an indication received from a tangible object and/or associating an operation to be executed with a tangible object according to an example embodiment of the present invention.

It should also be noted that while FIG. 2 illustrates one example of a configuration of an apparatus for determining operations to be executed and/or associating an operation to be executed with a tangible object, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). For example, the communication interface 74 may include one or more antenna(s) configured to receive signals, such as radio frequency (RF) signals, Bluetooth Low Energy (LE) signals, or other signals via Near Field Communication (NFC) protocol, as described in greater detail below. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch display 68 (e.g., the display 28). In different example cases, the touch display 68 may be a two dimensional (2D) or three dimensional (3D) display. The touch display 68 may be embodied as any known touch screen display. Thus, for example, the touch display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch display 68 to receive touch inputs at the touch display 68 and to analyze and/or modify a response to such indications based on corresponding user actions that may be inferred or otherwise determined responsive to the touch inputs.

In this regard, various indications of touch inputs may be received as a result of touch events at the touch display 68. For example, a force indication may be received, which is indicative of the amount of force applied due to contact with the touch display 68. Alternatively or additionally, a position indication may be received (e.g., x-, y-coordinates) that describes the location of the contact.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct, or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch display 68, for example through interaction of a tangible object, such as a stylus, with a surface of the touch display. As such, the touch screen interface 80 may be in communication with the touch display 68 to receive user inputs at the touch display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch display in a manner sufficient to register as a touch. In this regard, for example, a touch event could be a detection of pressure on the surface of the touch display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, placement, stroke, character, symbol, shape, swipe, pinch event (e.g., a pinch in or pinch out), and/or the like.

A touch may be defined as a touch event that impacts a single area (without or with minimal movement on the surface of the touch display 68) and then is removed. A multi-touch may be defined as multiple touch events sensed concurrently (or nearly concurrently). A stroke event may be defined as a touch event followed immediately by motion of the object initiating the touch event while the object remains in contact with the touch display 68. In other words, the stroke event may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character. A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Figure 3:
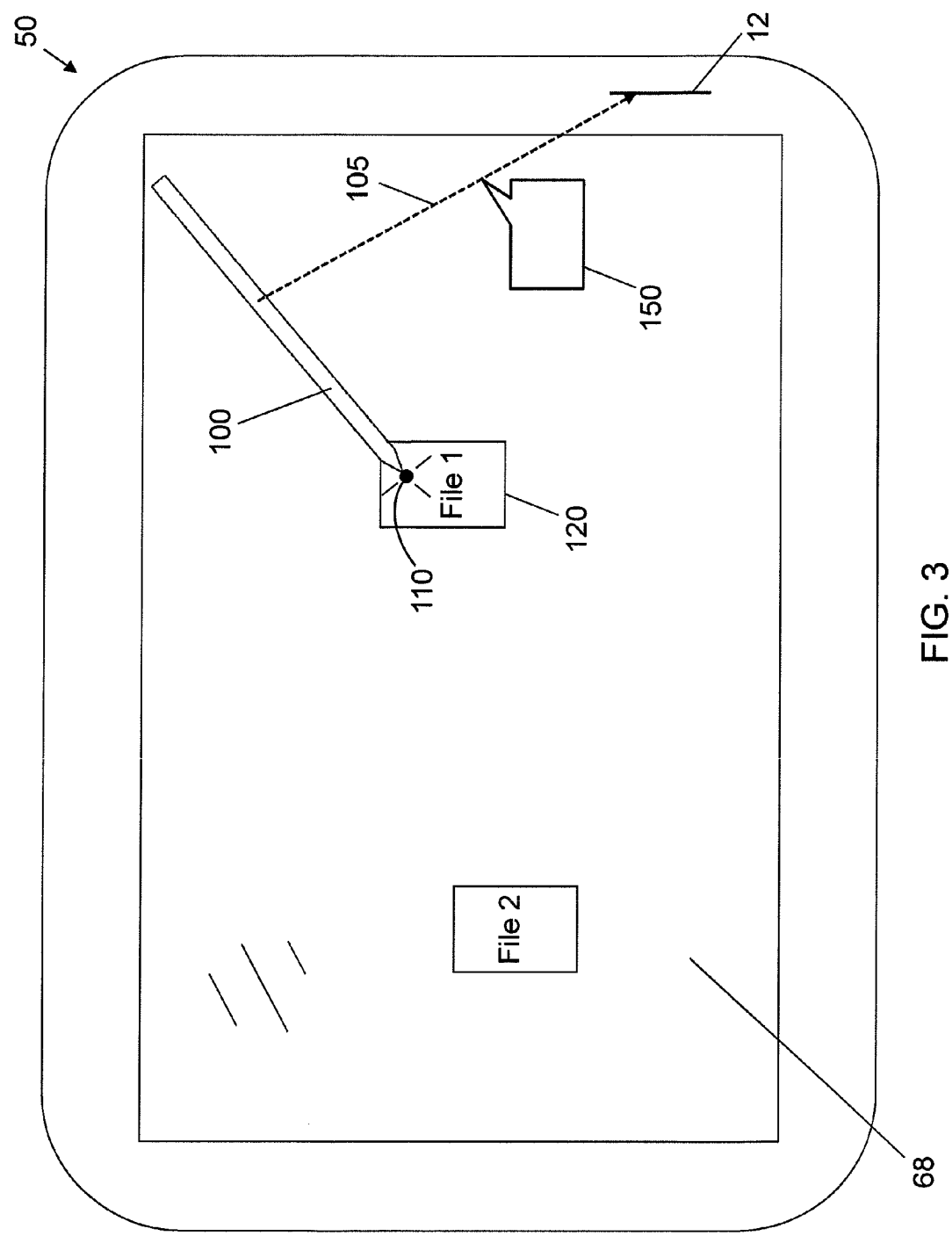
FIG. 3 illustrates an apparatus configured to determine an operation to be executed based on an indication received from a tangible object according to an example embodiment of the present invention.

Turning now to FIG. 3, in general, an apparatus 50, such as the mobile terminal 10 of FIG. 1, is provided that has (or is otherwise associated with) a touch display 68. As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to at least receive a signal 105 from a tangible object 100 proximate the apparatus. The signal 105 transmitted by the tangible object 100, which is represented by dashed-line arrow in FIG. 3, may include an indication of an operation to be executed upon receipt of a user input applied to the touch display 68 by the tangible object, as described below.

The at least one memory and the computer program code may be further configured to, with the processor, cause the apparatus 50 to determine the operation based on the indication. Accordingly, the at least one memory and the computer program code may be configured to, with the processor, cause the apparatus 50 to receive a user input 110 via interaction with the tangible object 100 and to execute the operation based on the user input that is received. In the depicted example, the tangible object 100 is used to apply a single-touch input 110 to the touch display 68 to select a document represented by an icon 120. However, in other examples, the user input may be a stroke (e.g., highlighting certain text) or a gesture selecting data (e.g., a circular gesture made around particular content presented on the display).

In other words, at least some embodiments of the present invention are configured to determine which operation is to be executed based on the indication that is embedded or otherwise described by the signal 105, without the need for a separate or further user input designating the desired operation. In this way, upon receipt of a user input 110 (e.g., a user input selecting the data to be manipulated), the operation may be executed automatically, without additional input from the user.

For example, with a conventional apparatus, a user who wishes to post a file to his or her website would typically be required to apply a user input to select the file by touching the tangible object to the touch display to select a representation of the file that is presented on the touch display. Upon selection of the file (e.g., through a single-touch input), several options for operations that can be executed may be presented to the user via the touch display, such as "Open," "Copy," "Post to Website," and "Send to Contact," for example. The user would then be required to apply an additional, separate user input to select the desired operation (in this example, "Post to Website"). Further user inputs may also be required, such as specifying the particular web address for the website to which the file is to be posted.

Embodiments of the present invention, in contrast, eliminate the need for the user to provide user inputs designating or defining the operation to be executed. Rather, the desired operation may be pre-associated with the tangible object 100 and may be communicated to the apparatus 50 via the indication of the signal 105, such that upon receipt of the user input selecting the particular content on which the operation is to be executed, the apparatus may simply execute the operation absent further intervention by the user.

In this regard, embodiments of the present invention may be configured to detect a signal 105 transmitted by the tangible object 100 when the tangible object 100 is in contact with or near the apparatus 50. For example, the apparatus 50 in the depicted embodiment of FIG. 3 may include or be in communication with an antenna 12 on the touch display 68 that is configured to receive radio frequency (RF), Bluetooth Low Energy (LE), or other Near Field Communication (NFC) signals and relay them to the processor. The signal 105 may be received by the apparatus 50 regardless of whether the tangible object 100 is in contact with the touch display 68 (e.g., based solely on a proximity to the apparatus). Thus, the signal 105 (and/or the indication of the operation carried by the signal) may be received prior to, simultaneously with, or subsequent to receipt of the user input 110, depending on the circumstances of the interaction between the tangible object 100 and the touch display 68 and the specific configurations of the tangible object and the apparatus 50.

Figure 4:
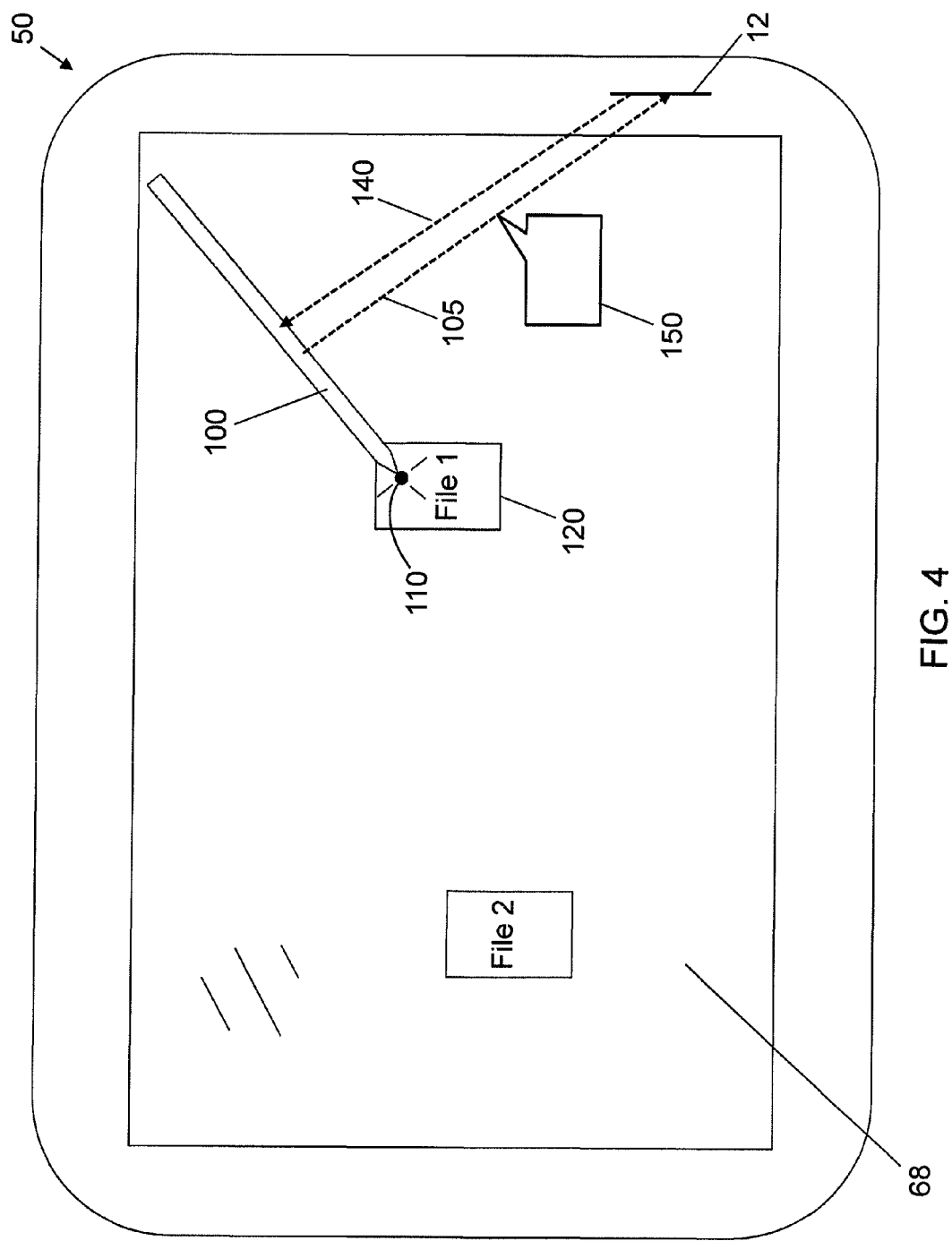
FIG. 4 illustrates an apparatus configured to determine an operation to be executed based on an indication received from a tangible object according to an example embodiment of the present invention in which the apparatus transmits an inquiry signal to the tangible object.

The signal 105 may be received from the tangible object 100 based solely on the fact that the tangible object 100 has come within a certain distance of the apparatus 50 (or the antenna 12 embodied by or associated with the apparatus), or the signal 105 may be received in response to an inquiry signal. In the case of the former, the tangible object 100 may be configured to continuously transmit a signal 105 including the indication of the operation to be executed. Thus, once the tangible object 100 is within range of the apparatus 50 (or, more specifically, a receiver, such as the antenna 12, of the apparatus), the signal 105 may be received. Alternatively, the apparatus 50 may be configured to periodically or continuously transmit an inquiry signal 140 (shown in FIG. 4) that requests transmission, by any device in the vicinity, of a response signal in the form of the signal 105. In this case, the tangible object 100 need not be constantly transmitting the signal 105 including the indication, but rather may transmit the signal in response to a request. Furthermore, in some cases, the inquiry signal 140 may be continuously transmitted, whereas in other cases the inquiry signal may be transmitted in response to the receipt of the touch input 110. In cases where the inquiry signal 140 is not continuously transmitted, the transmission of the inquiry signal may be invoked by the receipt of a touch input 110 at the touch display 68.

The indication carried by the signal 105 may describe the operation to be executed in several different ways. Turning to FIG. 5A, for example, the indication 150 may include an identifier of the tangible object 100 or an identifier of a user associated with the tangible object. For example, the indication may include a unique alphanumeric identifier that has been assigned to the tangible object 100 and/or a user account (e.g., a social networking account) that is associated with the tangible object.

Figure 6:
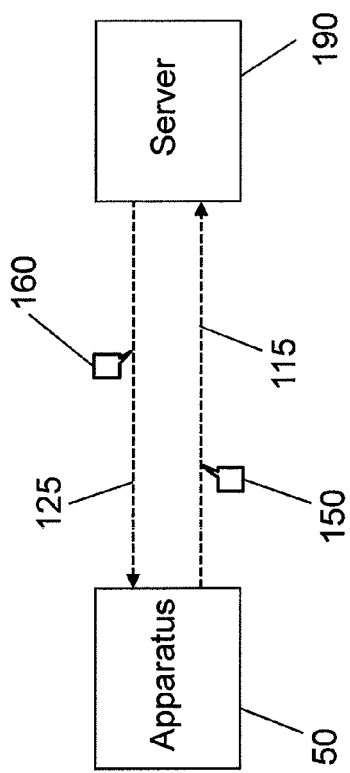
FIG. 6 illustrates a schematic block diagram of the apparatus of FIGS. 3 and 4 communicating with a server in response to receipt of the signal from the tangible object according to an example embodiment of the present invention.

In some cases, the memory and computer program code may be configured to, with the processor, cause the apparatus 50 to communicate with a server 190 in response to receipt of the signal 105, as shown in FIG. 6. For example, the apparatus 50 may transmit (e.g., via the antenna) a first signal 115 carrying or otherwise including the indication 150 that was received by the apparatus via the signal 105 (FIG. 3) to the server 190. The server 190 may, in turn, use the indication 150 to identify the operation to be executed and may then transmit a second signal 125 including designation of the operation 160 back to the apparatus 50. For example, in the case where the indication 150 includes an identifier of the tangible object 100 or a user associated with the tangible object, the server 190 may be configured to access a look-up table and to identify an operation 160 that corresponds to the particular identifier of the indication. The operation may be pre-associated with the identifier and defined in the look-up table or other database residing in a memory of the server 190 or in a memory accessible to the server, as described in greater detail below. Thus, in some embodiments, the apparatus 50 is caused to determine the operation based on the indication by communicating the indication 150 to a server 190.

In other cases, shown in FIG. 5B, the indication 150 designates the operation to be executed. In other words, the indication 150 directly identifies the operation to be executed. The apparatus 50 may determine the operation based on the indication without further reference to a server or device. For example, the indication 150 may include an identifier of the particular operation, and the apparatus 50 may be configured to determine the operation designated by the identifier via the memory of the apparatus. As another example, the identifier or other designation of the operation in the indication 150 may directly invoke execution of the operation upon receipt of the user input. In other cases, the apparatus 50 may communicate with a server or other remote device to determine the operation designated by the indication.

Figure 7:
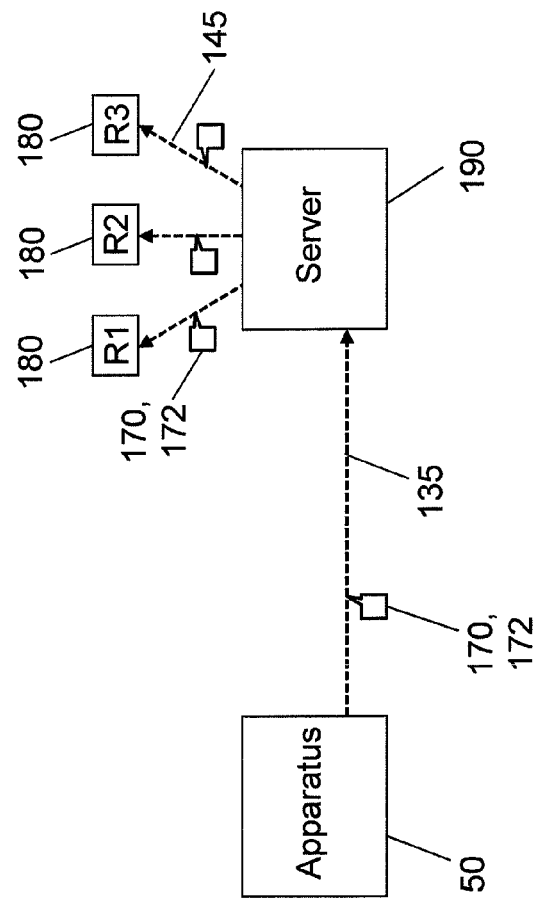
FIG. 7 illustrates a schematic block diagram of the apparatus of FIGS. 3 and 4 transmitting the selected data or information derived from the data to a server according to an example embodiment of the present invention.

As noted above, the user input 110 may, in some embodiments, comprise the selection of data, such as the selection of a particular document corresponding an icon 120 presented on the touch display 68, as depicted in FIG. 3. The memory and computer program code may be configured to, with the processor, cause the apparatus 50 to transmit the selected data 170 to a server 190 (e.g., via a transmission signal 135), as shown in FIG. 7. In other words, the apparatus 50 may determine that the operation described by the indication received via the signal 105 in FIG. 3 is to transmit the data selected via the user input 110 to the server 190. The server 190 may, in turn, execute further operations on the data 170 received from the apparatus 50. For example, in some cases, the server 190 may, upon receiving the selected data 170, send the data or copies of the data to one or more recipients 180 (such as recipients R1, R2, and R3) via a distribution signal 145.

Similarly, the memory and computer program code may be configured to, with the processor, cause the apparatus 50 to transmit information derived from the selected data 170 to the server 190, rather than the complete data. In other words, in the case where the selected data 170 is a file, the apparatus 50 may derive certain information from the file, including displayed data and/or metadata of other data that may not be displayed but is systematically associated with the data captured by the input selection, such as the author's name and contact information. Rather than transmitting the entire file to the server 190, apparatus 50 may transmit the derived information 172 (in this example, the author's name and contact information) via the transmission signal 135 to the server 190. The server 190 may then execute some other operation using the derived information 172 received. For example, the server 190 may transmit the author's name and contact information 172 to one or more recipients 180 (such as recipients R1, R2, and R3) via the distribution signal 145 and may add the information to each recipient's list of contacts.

Referring again to FIG. 3, each indication may be associated with a particular tangible object 100. Thus, the indication of the operation to be executed may be independent of the apparatus 50 determining the indicated operation and executing the operation, but rather may be carried by and relate back to the tangible object 100. In this way, a user may be able to have the same operation (e.g., the indicated operation) executed on multiple devices, without providing user input defining the desired operation, by merely using the same tangible object 100 to apply the user input to any of the multiple devices.

In some embodiments, the indication 150 that is provided to the apparatus 50 via the signal 105 (FIG. 3) relates to sharing of data with various recipients, where the data that is selected via subsequent user inputs applied by the tangible object 100. Thus, regardless of how the indicated operation is determined, the end result is the sending of certain data (e.g., selected via the user's interaction with the touch display 68 using the tangible object 100) to one or more predetermined recipients. In other words, the memory and computer program code may be configured to, with the processor, cause the apparatus 50 to receive an indication 150 of information associated with a tangible object 100 and to receive a user input 110 via the tangible object selecting data, such as data represented by a particular icon 120 presented on a touch display 68. The memory and computer program code may be further configured to, with the processor, cause the apparatus 50 to determine at least one recipient based on the indication 150 received and to provide for the data selected to be shared with the at least one recipient in response to receipt of the indication 150 and selection of the data.

Figure 8A:
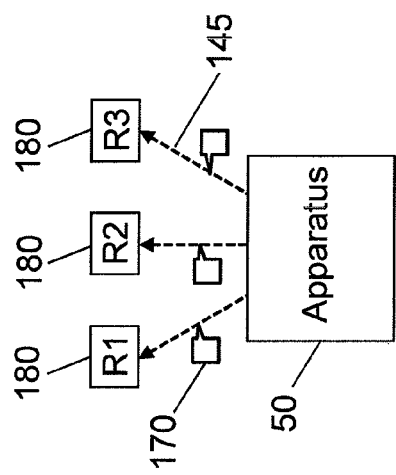
FIG. 8A illustrates a schematic block diagram of an apparatus configured to directly send selected data to one or more recipients according to an example embodiment of the present invention.
Figure 8B:
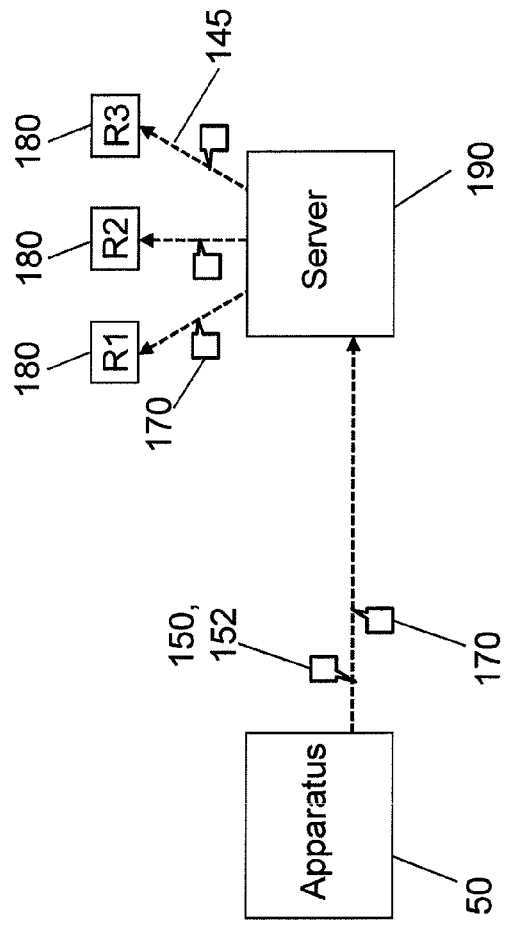
FIG. 8B illustrates a schematic block diagram of an apparatus configured to communicate with a server in response to receipt of the indication, where the at least one recipient is accessible via the server, according to an example embodiment of the present invention.

Referring to FIG. 8A, the apparatus 50 may be configured such that the selected data 170 is directly sent (e.g., via distribution signals 145) to the one or more recipients 180, for example, using e-mail, via a messaging service, or through a social networking account, as described below. Alternatively, another device, such as a server, may be used by the apparatus 50 as an intermediary to provide for the data 170 to be shared with the recipient(s) 180. With reference to FIG. 8B, for example, the memory and computer program code may be configured to, with the processor, cause the apparatus 50 to communicate with a server 190 in response to receipt of the indication 150, such as via a transmission signal 135. The at least one recipient 180 may be accessible via the server 190 based on the indication 150. For example, the indication 150 may include information describing the recipients 180, such as e-mail addresses of the recipients or other contact information that the server 190 can use to share the selected data 170 with each recipient (e.g., via the distribution signal 145). In some cases, the apparatus 50 may communicate the indication itself (including information identifying the recipients, as well as possibly other information) along with the data to the server 190, whereas in other cases the apparatus may provide instructions 152 derived from the information in the indication 150 for how the server 190 is to accomplish the sharing of the data (e.g., to which recipients the data should be sent and/or how to communicate with those recipients).

In this regard, the at least one recipient 180 may be related to a particular program. For example, the at least one recipient 180 may be associated with an e-mail address, as noted above, or the at least one recipient may be associated with a social networking account or presence, such as a Facebook® account, a Twitter® account, a LinkedIn® account, or any other account related to an online service, platform, or website for building social and professional networks and relationships. This may include non-traditional online services or platforms, such as an online public mural or collage that is accessible to online users and to which users can add content with or without a dedicated "account" specific to that service. In some cases, the at least one recipient 180 may be associated with the tangible object 100. For example, the at least one recipient may be included in a list of contacts that is predefined by the user and associated with the tangible object 100, as described in greater detail below. In still other cases, the at least one recipient 180 may be associated with a distribution list managed by a user of the tangible object 100. For example, the user may be another administrator of the tangible object or a remote third party (e.g., where the distribution list is associated with the tangible object but is managed by the remote third party). The distribution list may reside in a memory of the tangible object 100 itself, or the tangible object may hold an identifier or other descriptive information that can be used by the apparatus 50 or a device in communication with the apparatus (such as the server 190 of FIG. 8B) to access the distribution list.

Figure 9:
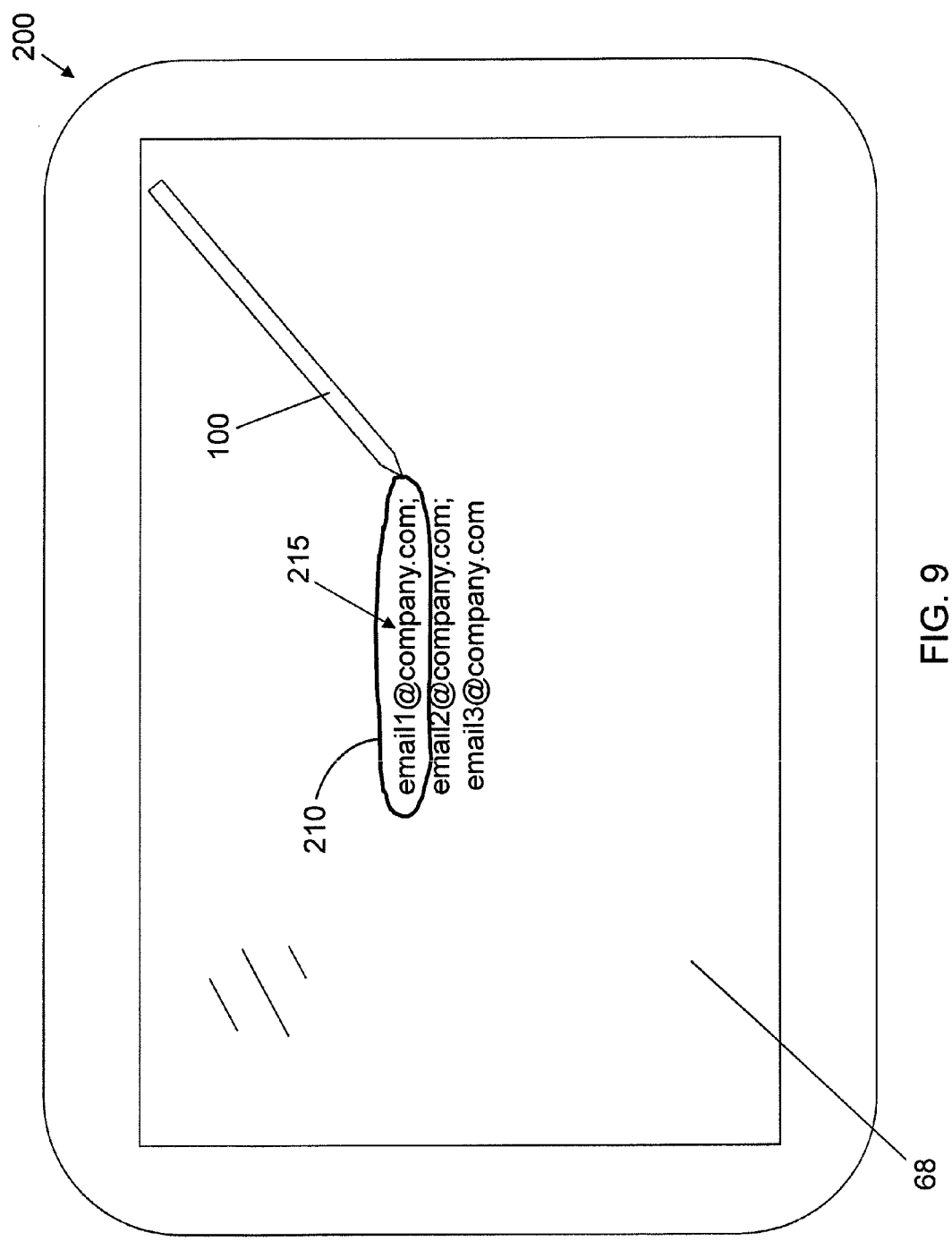
FIG. 9 illustrates an apparatus for providing for determination of an operation to be executed based on the identification and providing for association of the operation to be executed with a tangible object according to an example embodiment of the present invention.

Turning to FIG. 9, still other embodiments of the present invention provide an apparatus 200 comprising at least one processor and at least one memory including computer program code, where the memory and computer program code are configured to, with the processor, cause the apparatus 200 to receive an identification of a selection of content, provide for determination of an operation to be executed based on the identification, and provide for association of the operation to be executed with a tangible object 100, such that subsequent user input applied via the tangible object causes execution of the operation.

For example, a user may use the tangible object 100 to apply a user input 210 to the surface of a touch display 68 to select content 215 presented on the display, such as an e-mail address. The user input 210 may, for example, comprise a touch gesture that encircles the content 215, as shown. Thus, in some embodiments, the identification of a selection of content 215 may be the selected content itself (e.g., the e-mail address) or information describing the content. Upon receipt of the identification, the apparatus 200 may, in turn, be caused to provide for determination of the operation to be executed based on the identification by communicating the identification 220 or information derived from the identification to a server 290, such as via a signal 225, as shown in FIG. 10A. Furthermore, in some cases, the apparatus 200 may be caused to provide for association of the operation with the tangible object by communicating the identification 220 to the server 290.

In other words, the server 290 may, in some cases, be configured to determine which operation is to be executed and/or to associate that operation with the tangible object 100 based on the identification of the selection of content or other information that is communicated from the apparatus 200 to the server 290. Thus, the server 290 may communicate directly with the tangible object 100 in some embodiments to associate the operation 230 that is determined with the tangible object (such as via a signal 235). In other cases, the server 290, upon making the determination, may communicate the operation 230 back to the apparatus 200, and the apparatus 200 may communicate with the tangible object 100 to make the association (e.g., via a signal 245), as shown in FIG. 10B. In still other cases, the apparatus 200 may determine the operation to be executed based on the identification 220, as described in greater detail below, and the apparatus may then be caused to communicate the operation 230 to the server 290 such that the server may communicate directly with the tangible object 100 to accomplish the association (FIG. 10A).

In other embodiments, a server may not be involved in determining the operation or associating the operation with the tangible object. Rather, the apparatus 200 may, upon receipt of the identification of the selection of content, determine the operation and associate the operation with the tangible object, such that subsequent user input applied via the tangible object causes execution of that operation.

In still other cases, the apparatus 200 may be configured to communicate an identification 220 of the selection of content to the tangible object 100 (e.g., via a signal 225), as shown in FIG. 10C. The tangible object 100 may, in turn, be configured to receive the identification 220, to provide for determination of the operation to be executed based on the identification, and to provide for association of the operation to be executed with itself (the tangible object).

In other words, in some embodiments, the apparatus 50 shown in FIG. 2, which includes a processor and at least one memory including computer program code, may be the tangible object 100 of FIG. 10C. In other embodiments, the apparatus 50 shown in FIG. 2, which includes a processor and at least one memory including computer program code, may be the apparatus 200 shown in FIGS. 9 and 10B. In still other embodiments, the apparatus 50 shown in FIG. 2, which includes a processor and at least one memory including computer program code, may be the server 290 shown in FIGS. 10A and 10B.

Regardless of which device (the tangible object 100, the apparatus 200, or the server 290) is acting as the apparatus as described above, the memory and computer program code may be configured to, with the processor, cause the apparatus to determine a type of the content 215 selected, and the operation to be executed may be determined based on the type of content. For example, the type of content may be associated with a predefined operation. The content 215 may, for example, be a particular e-mail address, as shown in FIG. 9, and thus the type of content (an e-mail address) may be associated with an operation comprising the sending, via e-mail, of data to the recipient described by the particular e-mail address. As another example, the content selected may be a particular Uniform Resource Locator (URL) identifying a website blog. The type of content (a URL) may be associated with the predefined operation of posting data to the blog, such that subsequent user input applied via the tangible device 100 (e.g., applied to the apparatus 50 of FIG. 3) selecting certain data may serve to post the selected data to the blog. As yet another example, the content selected may be an icon representing a particular program, such as an image editor or a music player, and the type of content (a launchable program) may be associated with the predefined operation of opening data subsequently selected via the tangible object using that program.

Figure 11:
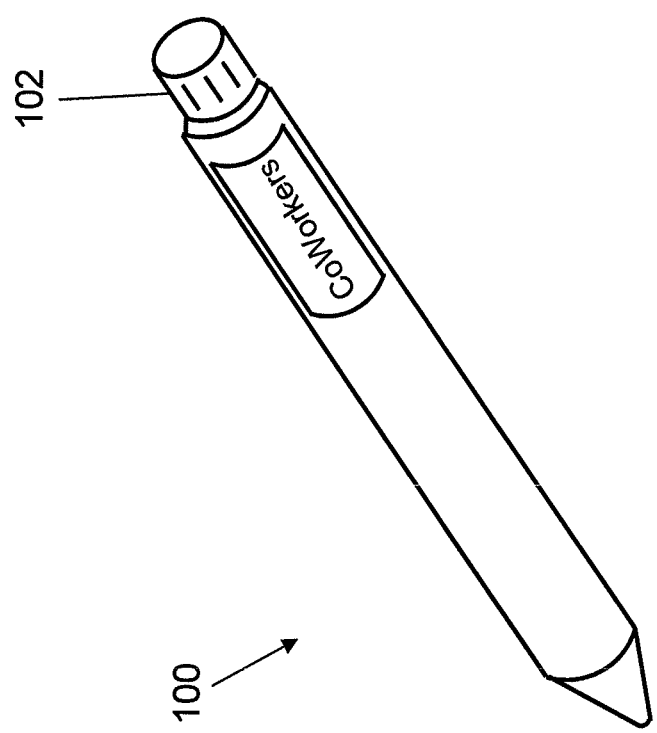
FIG. 11 illustrates a tangible object according to an example embodiment of the present invention.

In some embodiments, the memory and computer program code may be configured to, with the processor, cause the apparatus to enter a training mode. The memory and computer program code may further be configured to, with the processor, cause the apparatus to provide for determination of the operation to be executed and to provide for association of the operation to be executed with the tangible object in response to entry into the training mode. In other words, the tangible object 100 may restrict forming an association with the determined operation to circumstances in which the apparatus (e.g., the apparatus 200, the server 290, or the tangible object 100) has entered the training mode. The training mode may be entered, for example, via a setting that is selected on the tangible object 100 (such as through manipulation of a hard button or switch provided on the tangible object) or on the apparatus. One example of a tangible object 100 with a hard switch 102 is shown in FIG. 11.

Once in the training mode, for example, the user may create a group of recipients with whom the user wishes to share content by circling the group members' e-mail addresses. The user may further label the group of selected recipients (e.g., as "Coworkers") by "writing" on the surface of the touch display or typing a name for the group via the tangible object. The defined group and operation (e.g., sharing data subsequently selected via the tangible object with the defined group of recipients) may then be associated with the tangible object, as described above. In some cases, multiple groups of recipients may be defined in the training mode, and a particular group of recipients may be selected by the user via manipulation of a hard button or switch 102 (FIG. 11) provided on the tangible object.

In some cases, data may be shared by assigning a particular sharing program to the tangible object (thereby associating the program with the tangible object). For example, a social networking program may be associated with the tangible object, such that subsequent data selected via the tangible object may be posted to the user's social networking account to be viewable and/or accessible by those to whom the user has previously provided rights through the social networking service.

Figure 12:
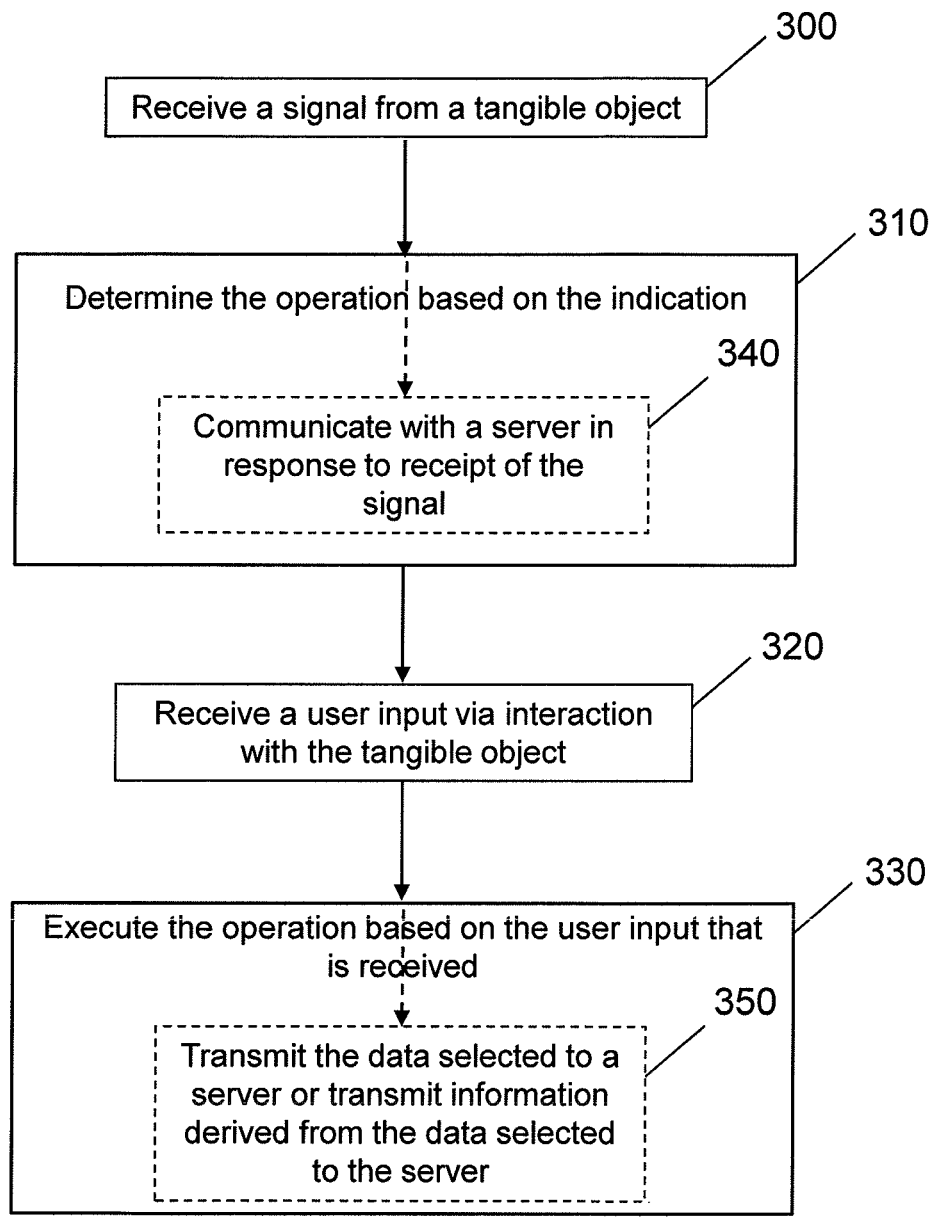
FIG. 12 illustrates a flowchart of methods of determining an operation to be executed based on an indication received from a tangible object in accordance with another example embodiment of the present invention.

FIGS. 12, 13, and 14 illustrate flowcharts of systems, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowcharts support combinations of means for performing the specified functions, combinations of operations for performing the specified functions, and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, one embodiment of a method for determining an operation based on an indication received via a tangible object, as shown in FIG. 12, includes receiving a signal from a tangible object at Block 300, wherein the signal includes an indication of an operation to be executed upon receipt of a user input applied by the tangible object. The method further includes determining, via a processor, the operation based on the indication at Block 310, receiving a user input via interaction with the tangible object at Block 320, and executing the operation based on the user input that is received at Block 330. In some cases, the operation may be executed automatically upon receipt of the user input.

The indication may comprise an identifier of the tangible object or a user associated with the tangible object, as described above. In other cases, the indication may designate the operation to be executed. Determining the operation based on the indication may, in some cases, comprise communicating with a server in response to receipt of the signal at Block 340. Moreover, in some cases where the user input comprises selection of data, the method may further include transmitting the data selected to a server or transmitting information derived from the data selected to the server at Block 350.

Turning to FIG. 13, another embodiment of a method for determining at least one recipient based on an indication of information associated with a tangible object is shown. The method includes receiving an indication of information associated with a tangible object at Block 400 and receiving a user input via the tangible object selecting data at Block 410. The method further includes determining, via a processor, at least one recipient based on the indication received at Block 420 and providing for the data selected to be shared with the at least one recipient in response to receipt of the indication and selection of the data, as described above, at Block 430. In some cases, providing for the data selected to be shared includes communicating with a server in response to receipt of the indication at Block 440, where the at least one recipient is accessible via the server based on the indication.

As described in the examples provided above, the at least one recipient may be related to a particular program. For example, the at least one recipient may be associated with an e-mail address or with a social networking account. In other cases, the at least one recipient may be associated with a tangible object. The at least one recipient may be associated with a distribution list managed by a user of a tangible object.

Still another embodiment of a method for providing for determination of an operation to be executed and providing for association of the operation with a tangible object is provided in FIG. 14. According to embodiments of the method, an identification of a selection of content is received at Block 500. The method further includes providing, via a processor, for determination of an operation to be executed based on the identification at Block 510 and providing, via a processor, for association of the operation to be executed with a tangible object at Block 520. In this way, subsequent user input applied via the tangible object to the same device that provided for the determination of the operation and/or the association, or to a different device, causes execution of the operation, as described above.

In some cases, the method further comprises providing for determination of a type of the content selected at Block 530, where the operation to be executed is determined based on the type of content. The type of content may be associated with a predefined operation. The method may further include entering a training mode at Block 540, where providing for determination of the operation to be executed and providing for association of the operation to be executed with the tangible object occurs in response to entry into the training mode, as described in the examples provided above. In some embodiments, providing for determination of the operation may comprise communicating the identification or information derived from the identification to a server at Block 550. Similarly, providing for association of the operation with the tangible object may comprise communicating the identification or information derived from the identification to a server at Block 560.

In some embodiments, certain ones of the operations above may be modified or further amplified as described below. Furthermore, in some embodiments, additional optional operations may be included, some examples of which are shown in dashed lines in FIGS. 12-14. Modifications, additions, or amplifications to the operations above may be performed in any order and in any combination.

In an example embodiment, an apparatus for performing the methods of FIGS. 12-14 above may comprise a processor (e.g., the processor 70 of FIG. 2) configured to perform some or each of the operations (300-560) described above. The processor may, for example, be configured to perform the operations (300-560) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 300, 340, 350, 400, 440, 550, and 560 may comprise, for example, the communication interface 74, the processor 70, and/or a device or circuit for executing instructions or executing an algorithm for processing information as described above. Examples of means for performing operations 310, 430, 510, 520, and 530 may comprise, for example, the processor 70, the communication interface 74, the memory device 76, and/or a device or circuit for executing instructions or executing an algorithm for processing information as described above. Examples of means for performing operations 320 and 410 may comprise, for example, the user interface transceiver 72, the processor 70, and/or a device or circuit for executing instructions or executing an algorithm for processing information as described above. Examples of means for performing operation 420 may comprise, for example, the processor 70, the memory device 76, and/or a device or circuit for executing instructions or executing an algorithm for processing information as described above. Examples of means for performing operations 330 and 500 may comprise, for example, the user interface transceiver 72, the communication interface 74, the memory device 76, the processor 70, and/or a device or circuit for executing instructions or executing an algorithm for processing information as described above. Moreover, examples of means for performing at least portions of operation 540 may comprise, for example, the processor 70 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
    prior to receipt of a user input applied by a digital pen to a display device controlled by the apparatus, wherein the user input selects data presented on the display device, receive a signal from the digital pen, wherein the signal describes an operation to be executed upon receipt of the user input;
    determine the operation based on the signal received;
    receive the user input via interaction of the digital pen with the display device, wherein receipt of the user input is independent of receipt of the signal; and
    execute the operation with respect to the selected data in response to receipt of the user input selecting the data, such that the operation is executed without further user input,
    wherein the digital pen is pre-programmed, prior to receipt of the signal by the apparatus, to trigger execution of the operation on any of a plurality of display devices receiving user input selecting data presented on a respective display device via the digital pen, such that the operation to be executed is pre-associated with the digital pen and is executable on any of the plurality of display devices receiving the user input via the digital pen.

2. The apparatus of claim 1, wherein the operation is executed automatically upon receipt of the user input.

3. The apparatus of claim 1, wherein the signal comprises an identifier of the digital pen or a user associated with the digital pen.

4. The apparatus of claim 1, wherein the memory and computer program code are configured to, with the processor, cause the apparatus to communicate with a server in response to receipt of the signal.

5. The apparatus of claim 1, wherein the signal designates the operation to be executed.

6. The apparatus of claim 1, wherein the memory and computer program code are configured to, with the processor, cause the apparatus to transmit the data selected to a server.

7. The apparatus of claim 1, wherein the memory and computer program code are configured to, with the processor, cause the apparatus to transmit information derived from the data selected to a server.

8. A method comprising:
    prior to receipt of a user input applied by a digital pen to a display device controlled by an apparatus, wherein the user input selects data presented on the display device, receiving a signal at the apparatus from the digital pen, wherein the signal describes an operation to be executed upon receipt of the user input;
    determining, via a processor, the operation based on the signal received;
    receiving the user input via interaction of the digital pen with the display device, wherein receipt of the user input is independent of receipt of the signal; and
    executing the operation with respect to the selected data in response to receipt of the user input selecting the data, such that the operation is executed without further user input,
    wherein the digital pen is pre-programmed, prior to receipt of the signal by the apparatus, to trigger execution of the operation on any of a plurality of display devices receiving user input selecting data presented on a respective display device via the digital pen, such that the operation to be executed is pre-associated with the digital pen and is executable on any of the plurality of display devices receiving the user input via the digital pen.

9. The method of claim 8, wherein the operation is executed automatically upon receipt of the user input.

10. The method of claim 8, wherein the signal comprises an identifier of the digital pen or a user associated with the digital pen.

11. The method of claim 8, wherein determining the operation based on the signal comprises communicating with a server in response to receipt of the signal.

12. The method of claim 8, wherein the signal designates the operation to be executed.

13. The method of claim 8 further comprising transmitting the data selected to a server or transmitting information derived from the data selected to the server.

14. A computer program product comprising at least one non-transitory computer-readable storage medium having computer-executable program code portions stored therein, the computer-executable program code portions comprising program code instructions for:
    prior to receipt of a user input applied by a digital pen to a display device controlled by an apparatus, wherein the user input selects data presented on the display device, receiving a signal at the apparatus from the digital pen, wherein the signal describes an operation to be executed upon receipt of the user input;
    determining the operation based on the signal received;
    receiving the user input via interaction of the digital pen with the display device, wherein receipt of the user input is independent of receipt of the signal; and
    executing the operation with respect to the selected data in response to receipt of the user input selecting the data, such that the operation is executed without further user input,
    wherein the digital pen is pre-programmed, prior to receipt of the signal by the apparatus, to trigger execution of the operation on any of a plurality of display devices receiving user input selecting data presented on a respective display device via the digital pen, such that the operation to be executed is pre-associated with the digital pen and is executable on any of the plurality of display devices receiving the user input via the digital pen.

15. The computer program product of claim 14, wherein the operation is executed automatically upon receipt of the user input.

16. The computer program product of claim 14, wherein the signal comprises an identifier of the digital pen or a user associated with the digital pen.

17. The computer program product of claim 14, wherein determining the operation based on the signal comprises communicating with a server in response to receipt of the signal.

18. The computer program product of claim 14, wherein the signal designates the operation to be executed.

19. The computer program product of claim 14 further comprising program code instructions for transmitting the data selected to a server or transmitting information derived from the data selected to the server.

* * * * *